United States Patent
Takamatsu

(10) Patent No.: US 7,689,339 B2
(45) Date of Patent: Mar. 30, 2010

(54) VEHICLE DRIVING FORCE CONTROL APPARATUS AND DRIVING FORCE CONTROL METHOD

(75) Inventor: Hideki Takamatsu, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 620 days.

(21) Appl. No.: 11/708,627

(22) Filed: Feb. 21, 2007

(65) Prior Publication Data

US 2007/0208479 A1 Sep. 6, 2007

(30) Foreign Application Priority Data

Mar. 1, 2006 (JP) .............................. 2006-054852

(51) Int. Cl.
*F02D 29/00* (2006.01)
*B06K 41/02* (2006.01)
*G06F 19/00* (2006.01)

(52) U.S. Cl. .................... 701/54; 701/61; 73/53.01

(58) Field of Classification Search .................. 701/51, 701/53, 56, 101, 86; 73/53.01, 582; 417/270, 417/222.2; 477/107
See application file for complete search history.

(56) References Cited

U.S. PATENT DOCUMENTS

| | | | | |
|---|---|---|---|---|
| 4,458,559 A | * | 7/1984 | Croswhite et al. | ............. 475/35 |
| 2005/0107214 A1 | * | 5/2005 | Koenig | ..................... 477/174 |

FOREIGN PATENT DOCUMENTS

| | | |
|---|---|---|
| JP | 09-268931 A | 10/1997 |
| JP | 2005-120886 A | 5/2005 |
| JP | 2005-180344 A | 7/2005 |

* cited by examiner

*Primary Examiner*—Tan Q Nguyen
(74) *Attorney, Agent, or Firm*—Sughrue Mion, PLLC

(57) ABSTRACT

When a speed ratio, which is the ratio of the turbine speed to the engine speed, is equal to or less than 1, a driving torque converter dynamic characteristic model is used which is set based on a driving torque converter static characteristic in which the torque ratio decreases to 1 with an increase of the speed ratio. When the speed ratio is greater than 1, a driven torque converter dynamic characteristic model is used which is set based on a driven torque converter static characteristic in which the torque ratio is 1 regardless of the speed ratio.

13 Claims, 3 Drawing Sheets

VEHICLE DRIVING FORCE CONTROL APPARATUS AND DRIVING FORCE CONTROL METHOD

INCORPORATION BY REFERENCE

The disclosure of Japanese Patent Application No. 2006-054852 filed on Mar. 1, 2006, including the specification, drawings and abstract is incorporated herein by reference in its entirety.

BACKGROUND OF THE INVENTION

1. Field of the Invention

The invention relates to a vehicular driving force control apparatus and control method of a vehicle having a powertrain that includes an engine and an automatic transmission. More particularly, the invention relates to a driving force control apparatus and driving force control method which appropriately outputs a driving force that corresponds to a driving force required by a driver.

2. Description of the Related Art

A control method known as "driving force control" has been employed in vehicles provided with an automatic transmission and an engine that can control engine output torque independently from an accelerator pedal operation by a driver. This driving force control calculates a positive and negative target driving force based on the accelerator pedal depression amount by the driver and operating conditions of the vehicle and the like, and realizes that calculated target driving force using engine torque and a speed ratio of the automatic transmission. Also, control methods referred to as "required driving force control" and "driving force demand control" are related to this control method.

A control apparatus of this kind of control method first calculates the target driving force to be generated in the vehicle based, for example, on the accelerator depression amount, the engine speed, external load, and a demand from a cruise control system. The control apparatus then converts the calculated target driving force into target torque taking the gear ratio of the automatic transmission and the like into account, and then controls the engine to generate this target torque.

According to the control apparatus of this kind of driving force control method, making the driving force which is a physical quantity that is directly applied to control of the vehicle a target value improves drivability by, for example, enabling a constant steering feeling to always be maintained.

Japanese Patent Application Publication No. JP-A-2005-180344 describes a drivetrain control apparatus in an integrated control system of a vehicle hierarchically configured such that calculations are performed from an upper control level which includes demands by the driver to a lower control level which includes actuators (actuators operate the transmission and drive source of the vehicle). This drivetrain control apparatus includes required output calculating means, target gear ratio determining means, shift controlling means, and generated torque calculating means. The transmission includes a torque converter, and the required output calculating means performs an inverse operation on the torque to be generated in the drive source from the required drive torque using a torque converter inverse model. The required output calculating means calculates the output required of the drive source. The target gear ratio determining means calculates the target gear ratio of the transmission. The shift controlling means controls the transmission, and the generated torque calculating means calculates the drive torque to be generated in the vehicle.

According to this drivetrain control apparatus, the necessary structure in the drivetrain control apparatus of the hierarchical integrated system of the vehicle is clear. That is, the required output calculating means calculates the required speed and required torque of the drive source. The target gear ratio determining means calculates the target gear ratio of the transmission. The shift controlling means calculates parameters that control the transmission. The generated torque calculating means calculates the drive torque to be generated in the vehicle. In this way, the necessary structure in the drivetrain control apparatus of the hierarchical integrated system of the vehicle is specified and the control parameters calculated by this drivetrain control apparatus can be output to an actuator of the lower control level and the control parameters can be output as availabilities to the upper control level. Accordingly, the required torque and required engine speed can be calculated by the drivetrain control apparatus based on various parameters related to the torque and vehicle speed that were calculated by the upper control level. In addition, the target gear ratio can be determined and the clutch load torque calculated from the shift duration and the target output shaft torque of the automatic transmission, and the control parameters can be output to an engine control apparatus and an automatic transmission control apparatus. More specifically, an inverse operation can be performed on the drive torque to be generated in the drive source from the required driving force using the torque converter inverse model. Therefore, in reality the drive source control parameters can be calculated from the required drive torque.

This torque converter is provided between an engine which serves as the drive source and, for example, a gear type stepped shifting mechanism. The output shaft of this shifting mechanism is connected via a differential gear to driving wheels. The torque converter is typically designed to ensure performance when the vehicle is in a driving state, i.e., when the input shaft rotation speed (on the engine side) is faster than the output shaft rotation speed (on the transmission side). Therefore, the model of the torque converter described above (and the inverse model which is the inverse function of this model) is also set to simulate the driving state which is the basic operating mode.

However, when the vehicle is in a driven state, i.e., when the output shaft rotation speed (on the transmission side) is faster than the input shaft rotation speed (on the engine side), the characteristics differ from those in the driving state. Therefore, the model of this driven state (and also the inverse model) differs from the model of the driving state (and its inverse model). In the foregoing drivetrain control apparatus, no distinction is made between the driving state and the driven state of the vehicle so the inverse operation of the drive torque from the required driving force may not be able to be accurately performed.

SUMMARY OF THE INVENTION

This invention thus provides a driving force control apparatus which, in a vehicle provided with an automatic transmission that includes a fluid coupling which has a torque multiplication function, is able to execute appropriate driving force control without being affected by the state of the fluid coupling.

A first aspect of the invention relates to a driving force control apparatus of a vehicle that transmits output of a drive source to a driving wheel via a fluid coupling. This driving force control apparatus includes a setting portion, a determining portion, and a control portion. The setting portion sets a target driving force generated in the vehicle via the driving wheel. The determining portion determines that a characteristic of the fluid coupling is a first characteristic when, in a relationship between an input shaft rotation and an output shaft rotation of the fluid coupling, the input shaft rotation is leading, and determines that the characteristic of the fluid coupling is a second characteristic when the output shaft rotation is leading. The control portion controls the drive source based on the target driving force and the characteristic of the fluid coupling.

According to this driving force control apparatus, a torque converter which is widely used as a fluid coupling, for example, has a torque multiplication function. When the input shaft rotation is leading, the torque converter multiplies torque (i.e., the torque multiplication function is active). When the output shaft rotation is leading, however, the torque converter does not multiply torque (i.e., the torque multiplication function is inactive). Therefore, when controlling an engine or the like which serves as the drive source, the control apparatus determines whether the characteristic of the torque converter is the first characteristic or the second characteristic in the process of calculating the engine torque necessary to generate the target driving force. Accordingly, driving force control can be executed differently depending on whether torque output from the engine is transmitted to the driving wheel after being multiplied or whether it is transmitted to the driving wheel without being multiplied. As a result, it is possible to provide a driving force control apparatus which, in a vehicle provided with an automatic transmission that includes a fluid coupling which has a torque multiplication function, is able to execute appropriate driving force control without being affected by the state of the fluid coupling.

A second aspect of the invention relates to a driving force control method of a vehicle that transmits output of a drive source to a driving wheel via a fluid coupling. This driving force control method includes setting a target driving force generated in the vehicle via the driving wheel; determining that a characteristic of the fluid coupling is a first characteristic when, in a relationship between an input shaft rotation and an output shaft rotation of the fluid coupling, the input shaft rotation is leading, and determining that the characteristic of the fluid coupling is a second characteristic when the output shaft rotation is leading; and controlling the drive source based on the target driving force and the characteristic of the fluid coupling.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Figure 1:
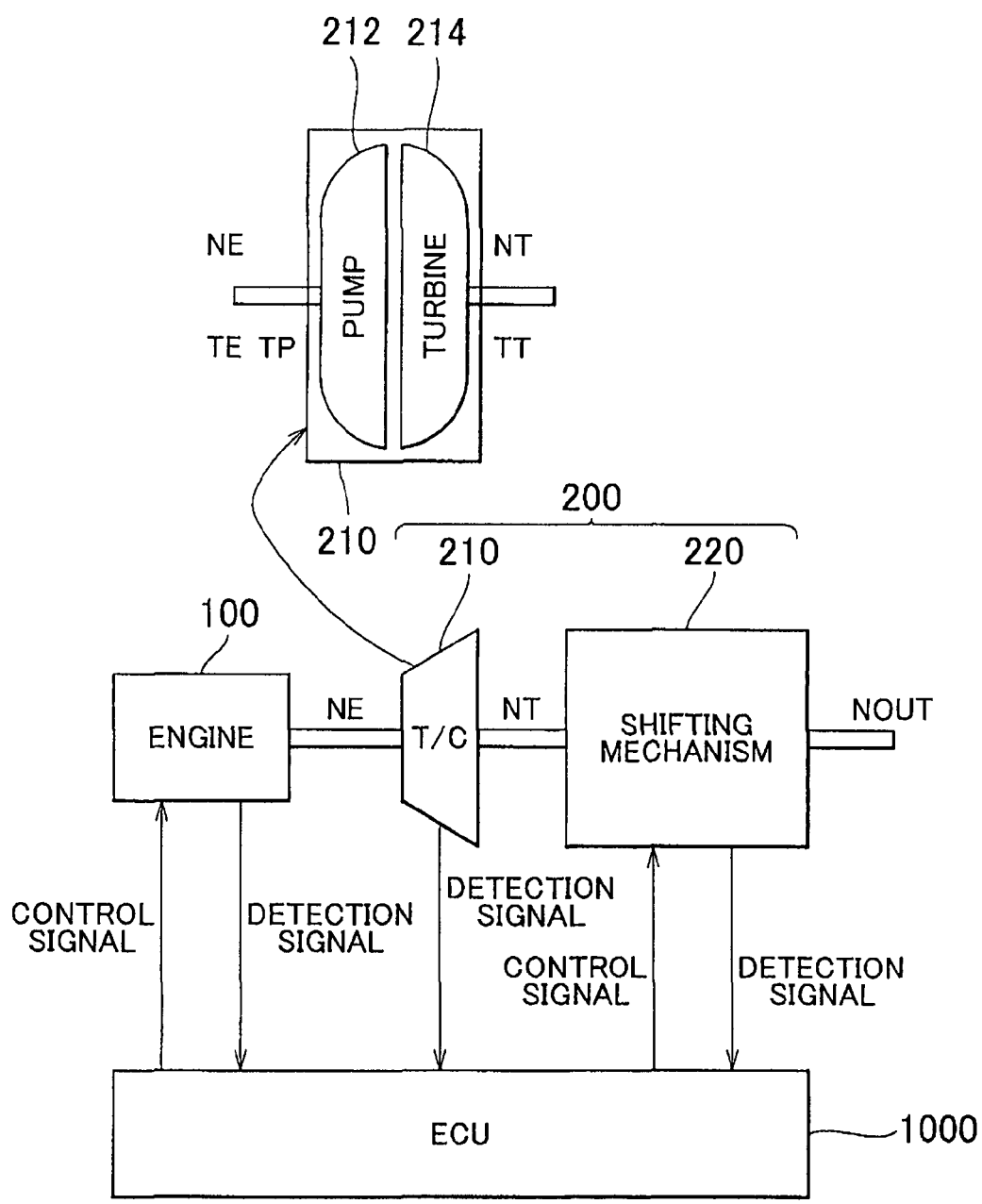
FIG. 1 is a control block diagram of a powertrain of a vehicle to which a control apparatus according to one example embodiment of the invention is applied.

Hereinafter, example embodiments of the invention will be described in detail with reference to the accompanying drawings. In the following description, like parts with be denoted by like reference numerals. Like parts will also be referred to by the same nomenclature and will have the same function. Therefore, detailed descriptions of those parts will not be repeated. The drive source in the invention is not limited to the engine described below, but may also be a motor (including a motor-generator).

A powertrain of a vehicle to which a driving force control apparatus according to one example embodiment of the invention (hereinafter also simply referred to as "control apparatus") is applied will now be described with reference to FIG. 1. Also, the vehicle described in this example embodiment is provided with an engine as the drive source for the vehicle.

As shown in FIG. 1, this vehicle powertrain includes an engine 100, an automatic transmission 200 which includes a torque converter 210 and a shifting mechanism 220, and an ECU (Electronic Control Unit) 1000 that controls the engine 100 and the automatic transmission 200. The ECU 1000 inputs various signals such as a signal indicative of an accelerator pedal depression amount from an accelerator pedal depression amount sensor and a signal from a brake switch (i.e., a switch that detects when a brake pedal is being depressed).

As described above, the automatic transmission 200 includes the torque converter 210 and the shifting mechanism 220. The torque converter 210 is a fluid coupling. The shifting mechanism 220 may be a gear type stepped shifting mechanism, a belt type continuously variable shifting mechanism, or a traction type variable shifting mechanism, for example. Hereinafter, the shifting mechanism 220 will be described as a gear type shifting mechanism, but the invention is not limited to the shifting mechanism 220 being a gear type shifting mechanism.

The torque converter 210 which is a fluid coupling includes a pump 212 (i.e., a pump impeller) which is a member on the engine 100 side and a turbine 214 (i.e., a turbine runner) which is a member on the shifting mechanism 220 side. The structure of this torque converter 210 is a typical one so a detailed description thereof will not be repeated here.

The speed of the engine 100 will be designated NE (hereinafter also referred to as engine speed, engine speed NE, or simply NE), the torque of the engine 100 will be designated TE (hereinafter also referred to as engine torque, engine torque TE, or simply TE), the torque on the input shaft side of the torque converter 210 will be designated TP (hereinafter also referred to as pump torque, pump torque TP, or simply TP), the output shaft rotation speed of the torque converter 210 will be designated NT (hereinafter also referred to as turbine speed, turbine speed NT, or simply NT), the output shaft torque of the torque converter 210 will be designated TT (hereinafter also referred to as turbine torque, turbine torque TT, or simply TT), and the output shaft rotation speed of the automatic transmission 200 will be designated NOUT (hereinafter also referred to as output shaft rotation speed, output shaft rotation speed NOUT, or simply NOUT). Also, the gear ratio of the shifting mechanism equals the turbine speed NT divided by the output shaft rotation speed NOUT (i.e., NT/NOUT). The TP which is the torque on the input shaft side of the torque converter 210 is the torque necessary to rotate the input shaft of the torque converter 210. Also, in the following description, when only the term "engine torque" appears, it refers to estimated engine torque because engine torque is unable to be directly detected by a sensor.

Figure 2:
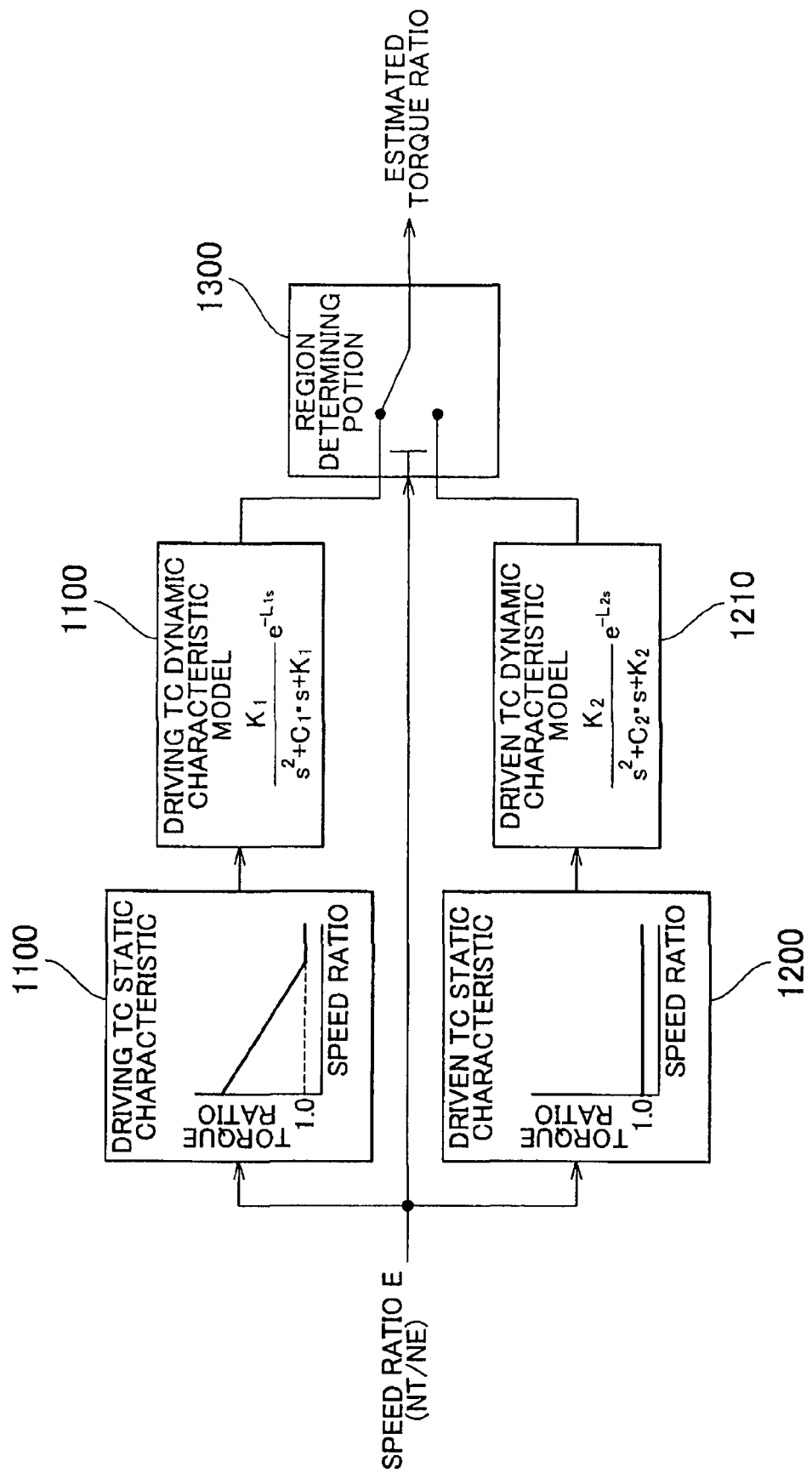
FIG. 2 is a control block diagram for calculating an estimated torque ratio of a torque converter.

FIG. 2 is a control block diagram used for calculating an estimated torque ratio of the torque converter in the control apparatus according to this example embodiment. The physical quantity that expresses the basic characteristic of the torque converter 210 will now be described. A speed ratio E of the turbine 214 and the pump 212 of the torque converter 210 equals NT/NE. A torque ratio T of the torque converter 210 equals TT/TE. A power transmission efficiency η of the torque converter 210 equals the output shaft horsepower divided by the input shaft horsepower, and the torque capacity C of the torque converter 210 equals $TP/NE^2$.

As shown in FIG. 2, the control apparatus according to this example embodiment (such as an engine ECU) has two kinds of torque converter dynamic characteristic models corresponding to the size of the speed ratio E. One is a driving torque converter dynamic characteristic model 1110 which is used when the vehicle is in the driving state and the other is a driven torque converter dynamic characteristic model 1210 which is used when the vehicle is in the driven state. The driving torque converter dynamic characteristic model 1110 and the driven torque converter dynamic characteristic model 1210 are both expressed by transfer functions in which a dead time component is added to a two-dimensional delay system component. In FIG. 2, coefficients $K_1$ and $K_2$ indicate spring constants in the torque converter dynamic characteristic models. Coefficient S indicates a Laplace operator. Coefficients $C_1$ and $C_2$ indicate viscosity constants in the torque converter dynamic characteristic models, and coefficients $L_1$ and $L_2$ indicate dead time components in the torque converter dynamic characteristic models. Coefficient E indicates an Euler's number. However, coefficient $K_1$ and coefficient $K_2$ are not limited to being the same value, coefficient $C_1$ and coefficient $C_2$ are not limited to being the same value, and coefficient $L_1$ and coefficient $L_2$ are not limited to being the same value.

Also, in front of the driving torque converter dynamic characteristic model 1110 is a block 1100 that expresses a torque ratio characteristic diagram of a driving torque converter static characteristic, and in front of the driven torque converter dynamic characteristic model 1210 is a block 1200 that expresses a torque ratio characteristic diagram of a driven torque converter static characteristic. Each of the dynamic characteristic models is based on the relationship between the torque ratio and the speed ratio of the corresponding torque converter static characteristic.

As shown in the torque ratio characteristic diagram of the driving torque converter static characteristic of the block 1100, the torque ratio T has a characteristic in which it uniformly decreases from approximately 1.5 to 1.0 as the speed ratio E increases. At this time, the pump speed NP (=NE) which is the input shaft rotation speed (on the engine side) of the torque converter 210 is faster than the turbine speed NT which is the output shaft rotation speed (on the shifting mechanism side). That is, the speed ratio E is equal to or less than 1.

As shown in the torque ratio characteristic diagram of the driven torque converter static characteristic of the block 1200, the torque ratio T is uniform at 1.0 regardless of an increase in the speed ratio E (i.e., torque is not multiplied). At this time, the turbine speed NT which is the output shaft rotation speed (on the shifting mechanism side) of the torque converter 210 is faster than the pump speed NP (=NE) which is the input shaft rotation speed (on the engine side). That is, the speed ratio E is greater than 1.

A region determining portion 1300 determines which of the two torque converter dynamic characteristic models to use based on the magnitude relation between the speed ratio E and 1. When the speed ratio E is equal to or less than 1, the region determining portion 1300 determines that the driving torque converter dynamic characteristic model 1110 is to be used.

When the speed ratio E is greater than 1, the region determining portion 1300 determines that the driven torque converter dynamic characteristic model 1210 is to be used.

In this way, the determination as to whether the vehicle is in the driving state or the driven state is made based on the speed ratio of the torque converter 210, and the torque converter dynamic characteristic model when an inverse transform is performed from the target driving force to the target engine torque is changed. That is, when the transfer function expressed as the torque converter dynamic characteristic model is designated P(s), driving force control is performed using the inverse function $P(s)^{-1}$. An outline of this driving force control will now be described.

Figure 3:
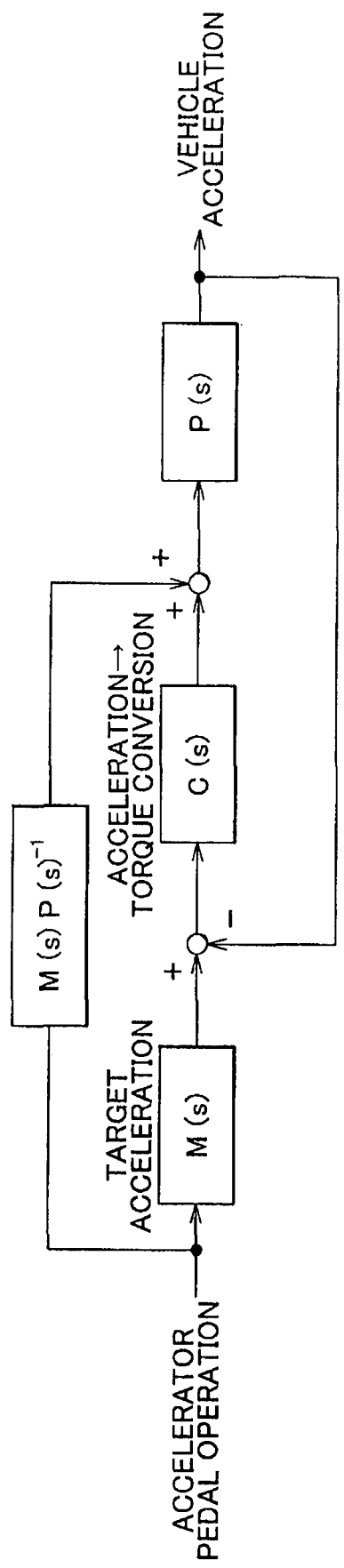
FIG. 3 is a control block diagram of the entire powertrain.

FIG. 3 is a control block diagram of the overall powertrain and illustrates a case in which the torque converter dynamic characteristic model is changed between the driving state of the vehicle and the driven state of the vehicle, as in FIG. 2 described above, and then applied to a vehicle acceleration control system. The detailed portions of the actual control system are not shown.

As shown in FIG. 3, a target acceleration is calculated from the accelerator pedal depression amount using a transfer function M(s). The calculated target acceleration is then converted from target acceleration into torque using a transfer function C(s) of a feedback control system that includes a PID element (i.e., acceleration→torque conversion).

Meanwhile, the torque based on the dynamic characteristic of the torque converter 210 is calculated from the accelerator pedal depression amount using a transfer function $M(s)P(s)^{-1}$. The torque calculated using the transfer function C(s) and the torque calculated using the transfer function $M(s)P(s)^{-1}$ are then added together and the sum is then converted into vehicle acceleration using the transfer function P(s). The vehicle acceleration is then returned to what it was right before the transfer function C(s) in order to calculate the variation in the feedback control system.

When using the transfer function $P(s)^{-1}$ in the acceleration control system shown in FIG. 3 in this way, the transfer function P(s) is set according on whether the vehicle is in the driving state or the driven state, and then the transfer function $P(s)^{-1}$ is set from that transfer function P(s) according to whether the vehicle is in the driving state or the driven state, as shown in FIG. 2. As a result, less error is generated in the torque calculated using the transfer function $M(s)P(s)^{-1}$ so the control accuracy of the acceleration control system improves. More specifically, vehicle acceleration more accurately reflects the demand of the driver (which is transmitted to the control system via the accelerator pedal) and the load on the feedback control system (i.e., the amount that the feedback control system is operated) decreases.

As described above, in this example embodiment, the dynamic characteristic model of the torque converter is changed depending on whether the vehicle is in the driving state or the driven state. Thus an extremely accurate driving control system can be made by forming a control system using the inverse function of a transfer function that expresses a dynamic characteristic model that distinguishes between whether the vehicle is in a driving state or a driven state.

The example embodiments disclosed herein are in all respects merely examples and should in no way be construed as limiting. The scope of the invention is indicated not by the foregoing description but by the scope of the claims for patent, and is intended to include all modifications that are within the scope and meanings equivalent to the scope of the claims for patent.

What is claimed is:

1. A driving force control apparatus of a vehicle that transmits output of a drive source to a driving wheel via a fluid coupling, comprising:
   a setting portion that sets a target driving force generated in the vehicle via the driving wheel;
   a determining portion which determines that a characteristic of the fluid coupling is a first characteristic when, in a relationship between an input shaft rotation and an output shaft rotation of the fluid coupling, the input shaft rotation is leading, and determines that the characteristic of the fluid coupling is a second characteristic when the output shaft rotation is leading; and
   a control portion that controls the drive source based on the target driving force and the characteristic of the fluid coupling.

2. The driving force control apparatus of a vehicle according to claim 1, wherein the control portion calculates a target torque of the drive source.

3. The driving force control apparatus of a vehicle according to claim 1, wherein the determining portion determines which characteristic, from among the first characteristic and the second characteristic, the characteristic of the fluid coupling is based on an input shaft rotation speed and an output shaft rotation speed of the fluid coupling.

4. The driving force control apparatus of a vehicle according to claim 1, wherein the fluid coupling is a torque converter having a torque multiplication function; the first characteristic is a characteristic in which the torque multiplication function is active; and the second characteristic is a characteristic in which the torque multiplication function is inactive.

5. The driving force control apparatus of a vehicle according to claim 3, wherein the determining portion determines that the characteristic of the fluid coupling is the first characteristic when a ratio of the output shaft rotation speed of the fluid coupling to the input shaft rotation speed of the fluid coupling is equal to or greater than a predetermined value; and determines that the characteristic of the fluid coupling is the second characteristic when the ratio of the output shaft rotation speed of the fluid coupling to the input shaft rotation speed of the fluid coupling is less than the predetermined value.

6. The driving force control apparatus of a vehicle according to claim 1, wherein the control portion calculates a target torque of the drive source based on the target driving force and the characteristic of the fluid coupling, and controls the drive source to output the target torque.

7. A driving force control apparatus of a vehicle that transmits output of a drive source to a driving wheel via a fluid coupling, comprising:
   setting means for setting a target driving force generated in the vehicle via the driving wheel;
   determining means for determining that a characteristic of the fluid coupling is a first characteristic when, in a relationship between an input shaft rotation and an output shaft rotation of the fluid coupling, the input shaft rotation is leading, and determining that the characteristic of the fluid coupling is a second characteristic when the output shaft rotation is leading; and
   controlling means for controlling the drive source based on the target driving force and the characteristic of the fluid coupling.

8. A driving force control method of a vehicle that transmits output of a drive source to a driving wheel via a fluid coupling, comprising:
   setting a target driving force generated in the vehicle via the driving wheel;
   determining that a characteristic of the fluid coupling is a first characteristic when, in a relationship between an input shaft rotation and an output shaft rotation of the fluid coupling, the input shaft rotation is leading, and determining that the characteristic of the fluid coupling is a second characteristic when the output shaft rotation is leading; and
   controlling the drive source based on the target driving force and the characteristic of the fluid coupling.

9. The driving force control method of a vehicle according to claim 8, further comprising:
   calculating a target torque of the drive source based on the target driving force and the characteristic of the fluid coupling.

10. The driving force control method of a vehicle according to claim 8, wherein the determination as to which characteristic, from among the first characteristic and the second characteristic, the characteristic of the fluid coupling is, is made based on an input shaft rotation speed and an output shaft rotation speed of the fluid coupling.

11. The driving force control method of a vehicle according to claim 8, wherein the fluid coupling is a torque converter having a torque multiplication function; the first characteristic is a characteristic in which the torque multiplication function is active; and the second characteristic is a characteristic in which the torque multiplication function is inactive.

12. The driving force control method of a vehicle according to claim 10, wherein the characteristic of the fluid coupling is determined to be the first characteristic when a ratio of the output shaft rotation speed of the fluid coupling to the input shaft rotation speed of the fluid coupling is equal to or greater than a predetermined value; and the characteristic of the fluid coupling is determined to be the second characteristic when the ratio of the output shaft rotation speed of the fluid coupling to the input shaft rotation speed of the fluid coupling is less than the predetermined value.

13. The driving force control method of a vehicle according to claim 8, wherein the a target torque of the drive source is calculated based on the target driving force and the characteristic of the fluid coupling, and the drive source is controlled to output the target torque.

* * * * *